United States Patent [19]

Oude Alink et al.

[11] 3,835,927
[45] Sept. 17, 1974

[54] PROCESS OF REMOVING SULFUR FROM FLUIDS

[75] Inventors: Bernardus A. Oude Alink; Robert R. Annand; Derek Redmore, all of St. Louis, Mo.

[73] Assignee: Petrolite Corporation, Wilmington, Del.

[22] Filed: June 22, 1972

[21] Appl. No.: 265,242

Related U.S. Application Data

[62] Division of Ser. No. 46,465, June 15, 1970, abandoned.

[52] U.S. Cl................ 166/304, 166/310, 166/311, 252/8.3
[51] Int. Cl............................................ E21b 43/00
[58] Field of Search....... 23/312 S; 166/244 D, 265, 166/300, 304, 310, 311; 252/8.3, 8.55 B; 137/13

[56] References Cited
UNITED STATES PATENTS

| | | | |
|---|---|---|---|
| 2,798,772 | 7/1957 | Redcay | 137/13 |
| 3,331,657 | 7/1967 | Peter et al. | 252/8.3 |
| 3,375,192 | 3/1968 | Rowlinson | 166/304 |
| 3,445,387 | 5/1969 | Liston | 252/8.55 E |
| 3,543,857 | 12/1970 | Gerner | 166/310 |

OTHER PUBLICATIONS

"Sulfur Plugging Whipped in Gas Wells," Oil and Gas Journal, April 17, 1967, pp. 113 and 114.

*Primary Examiner*—Stephen J. Novosad
*Assistant Examiner*—Jack E. Ebel
*Attorney, Agent, or Firm*—Sidney B. Ring; Hyman F. Glass

[57] ABSTRACT

A method of inhibiting, preventing, reducing, and/or reversing sulfur plugging which comprises treating sulfur-containing fluids in oil and gas wells, such as petroleum (and/or fluids containing a component which converts to sulfur), with a reactant compound capable of combining with sulfur to produce products which are soluble or dispersible in the sulfur-containing fluids. This process is illustrated by the use of olefins as the reactive compound, and more particularly by the use of an olefin capable of reacting with sulfur to form 1,2-dithiole-3-thiones.

12 Claims, No Drawings

PROCESS OF REMOVING SULFUR FROM FLUIDS

This application is a division of application Ser. No. 46,465, filed June 15, 1970 and now abandoned.

Oil and gas wells after a certain period of production often decrease in flow due to the formation of deposits of sulfur. This is particularly true in the production and processing of petroleum having high $H_2S$ content where variations in pressure and temperature inherent in normal operations cause sulfur "drop out" and resulting sulfur plugging. For example, sulfur plugging may occur in the following places:

1. In the formations itself.
2. In the tubing and casing.
3. In tubes of heat exchanger in gathering systems.
4. In Plant piping facilities, etc.

Examples of facilities in which sulfur plugging may occur are presented in the description and drawings of Ser. No. 727,901, filed on May 9, 1968, now abandoned, which is by reference incorporated into the present application as if part hereof.

A current method of combating sulfur plugging is to contact the system with carbon disulfide. However, because of the fire hazard experienced when carbon disulfide is employed, there is a great reluctance to use this solvent since it has a boiling point of 46.2° C. and an ignition point of about 100° C. Thus local hot spots and/or mixtures of $CS_2$ with air can often be very explosive. Therefore, it is highly desirable to be able to solve the problem of sulfur plugging without using a hazardous solvent like carbon disulfide.

We have now devised a method of inhibiting, preventing, reducing and/or reversing sulfur plugging which comprises treating sulfur containing fluids and/or fluids containing components which will convert to sulfur with a compound capable of reacting with sulfur and/or a sulfur-containing compound (i.e., a sulfur reactant).

One method comprises treating the system with an olefin capable of reacting with sulfur to form reaction products thereof such as 1,2-dithiole-3-thiones which may be expressed by the formula

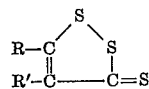

where R and R' are substituted groups, for example, alkyl, aryl, cycloalkyl, alkenyl, alkynyl, alkaryl, heterocyclic, hydrogen, etc.

The reaction may be summarized as follows:

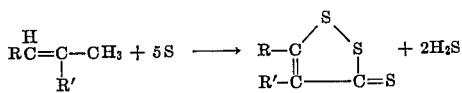

The olefin employed in the reaction should contain:

1. a reactive double bond
2. a primary carbon atom
3. at least four hydrogen atoms on the three terminal carbons with at least one hydrogen on the carbon beta to the primary carbon atom.

In addition to the 1,2-dithiole-3-thiones other sulfur-containing compounds are formed for example mercaptans, disulfides, thiophenes and other sulfur-containing by-products.

The reaction may be carried out at any suitable time and temperature, for example, at about 100° – 300° C. such as from about 140° – 240° C. but preferably from about 160° – 220° C. for a period of 2 – 160 hours, such as from 10 – 20 hours, but preferably from about 15 – 40 hours. Such temperatures are present in petroleum formations.

The above formula shows the idealized final product. In addition intermediate products can also be found which are capable of inhibiting, preventing, reducing or reversing sulfur plugging. After reacting, the product is brought up to the surface where it is removed from the system. In addition, the presence of 1,2-dithiole-3-thiones also performs another function in that it is a solvent for sulfur.

The reaction may be carried out with or without the presence of a catalyst. Catalysts which can be employed are illustrated by the following: basic amines such as guanidines, cyclic amidines (imidazolines, tetra-hydropyrimidines), alkylene polyamines, etc. The use of a catalyst is particularly useful in lower temperature wells, e.g. 150° – 250° F., since it allows a much more rapid reaction between sulfur and olefin.

The results are surprising in view of the fact that in most sulfur plugging wells there is a high concentration of $H_2S$ which, according to the law of chemical equilibrium and mass action, would be expected to tend to impede the formation of 1,2-dithiole-3-thiones due to a shift of the reaction in favor of the presence of the olefin and sulfur. In addition, because of the individual variance in the conditions of wells as to temperature, pressure, the wide variety of other constituents present in petroleum, concentration and pressure of $H_2S$, $CO_2$ and other gases, it is difficult to predict the effect of such components and conditions would be upon the reaction.

In order to test the effectiveness of the present process of removing sulfur, it is often desirable to subject the sample of petroleum to the $H_2S$ pressure and temperature found in the well and to measure the amount of free sulfur present before and after reaction.

This is illustrated by the following examples:

EXAMPLE 1

In an autoclave was placed 230 grams of sulfur and 1,000 cc of α-methyl styrene. The mixture was heated at 380° – 400° F. for 24 hours. The pressure resulting from the formation of hydrogen sulfide was 20 lbs./in². After completion the pressure was released and the solution filtered. A total of 80 grams of solids were collected. The solid mainly of 4-phenyl - 1,2-dithiole-3-thione. Thus, the decrease in the original free sulfur content is greater than 65 percent.

EXAMPLE 2

In an autoclave was placed 380 g. of sulfur and 450 g. of tetrapropylene. After the mixture was heated at 380° – 400° F. for 24 hours, the internal pressure was 80 lb./in². The amount of free sulfur isolated was 120 g. This represented a decrease of 68 percent in free sulfur. The remaining products formed were a mixture of dithiolthiones, mercaptans and other materials.

FIELD EXAMPLES

The above Examples are laboratory simulations of well conditions. In the field, the olefin with or without catalyst is injected downhole in the well fluids and allowed to react with the sulfur present in the system. The conditions of the well such as temperature, pressure, etc., will cause the olefin to react with sulfur after sealing off the well for a period of time sufficient to allow optimum reaction, which will depend upon well conditions, such as from about 1/2 to 12 hours, for example from about 1 to 10 hours, but preferably about 1 to 6 hours. In squeeze treatment reaction periods may exceed days, weeks, months or even years.

Pressure build up occurs during the reaction since $H_2S$ is a product of the reaction. When the reaction is completed the well is opened and fluids containing the sulfur which reacted to form sulfur compounds are returned to the surface and removed.

Analogous procedures can also be employed to reverse sulfur plugging occurring in other parts of the system such as in well tubing, in the tubing of tanks of the gathering system, in the plant facilities, in the tanks, employed in separation, in the heat exchangers, etc.

One method of carrying out the invention is by means of "squeeze treatment," i.e., by injecting the sulfur reactant through the well bore of the producing well into the formation to react with sulfur in the formation. By causing reaction deep in the pores of the formation, sulfur is converted into a soluble reaction product which will not deposit in the tubing or other places in the producing system. In "squeeze treatment" the sulfur reactant or a solution of the sulfur reactant is forced into the formation with a pump working against the natural pressure. Following this, an "over flush" of fluid is put behind the sulfur reactant to provide displacement into the formation to react with the sulfur contained therein. "Squeeze treatment" not only gives a longer reaction period (such as from days to months to a year or more) but also takes care of the sulfur problem before it becomes troublesome by deposition in the production or gathering systems.

Although the invention is primarily illustrated with the use of olefins, other reactants can also be employed, for example in the manner of the following reactions:

1. Ketones, for example of the formula $$R-\overset{O}{\underset{\|}{C}}-R'$$

where the R's are hydrocarbons such as alkyl, aryl, cycloalkyl, etc. and substituted derivatives thereof, for example, according to the reaction:

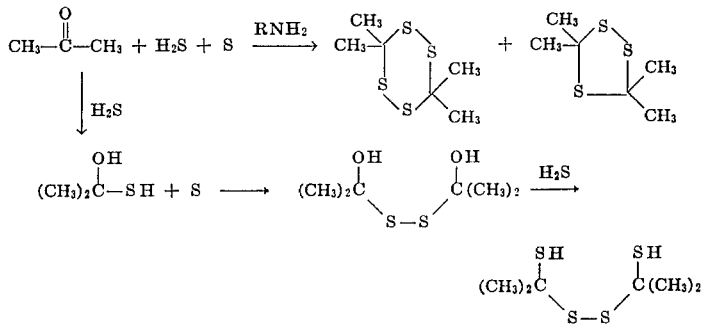

2. The reaction of dinitriles and carbon disulfide with sulfur, for example, according to the equation:

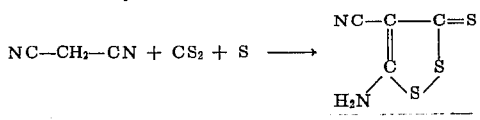

3. The reaction of an enamine with carbon disulfide and sulfur, for example, according to the formula

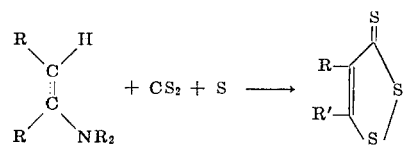

where the R's are, for example, hydrocarbon such as alkyl, aryl, cycloalkyl, etc. The R's attached to the nitrogen may be cyclic so as to include the nitrogen in the cyclic ring, as well as an unsaturated ring, for example:

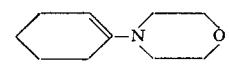

4. The reaction of a cyclic olefin with sulfur, for example according to the formula:

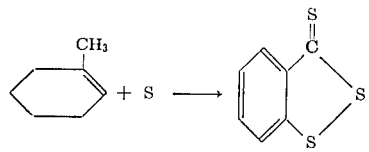

5. Other reactants capable of reacting with sulfur.

As is quite evident, other reactants capable of reacting with sulfur besides those specifically disclosed herein are useful in this invention. It is, therefore, not only impossible to attempt a comprehensive catalogue of such reactants, but to attempt to describe the invention in its broader aspects in terms of specific chemical names of its components used would be too voluminous and unnecessary since one skilled in the art could by following the description of the invention herein select a useful olefin. This invention lies in the use of suitable reactants in removing sulfur from sulfur-containing systems and the individual compositions of the reactants are important only in the sense that their properties can affect this function. To precisely define each specific useful reactant and sulfur-containing system in light of the present disclosure would merely call for chemical knowledge within the skill of the art in a manner analogous to a mechanical engineer who prescribes in the construction of a machine the proper materials and the proper dimensions thereof. From the description in this specification and with the knowledge of a chemist, one will know or deduce with confidence the applicability of specific reactants suitable for this invention by applying them in the process set forth herein. In analogy to the case of a machine, wherein the use of certain materials of construction or dimensions of parts would lead to no practical useful result, various materials will be rejected as inapplicable where others would be operative. One can obviously assume that no one will wish to use a useless reactant nor be misled because it is possible to misapply the teachings of the present disclosure to do so. Thus, any reactant that can perform the function stated herein can be employed.

Having thus described our invention what we claim as new and desire to obtain by Letters Patent is:

1. A process of inhibiting, reducing, preventing, and/or reversing sulfur-plugging in sulfur-containing fluids in oil wells or gas wells, said fluids containing a component which converts to sulfur, said process comprising adding to said fluids an organic compound capable of reacting with sulfur, sealing off the well to allow sufficient time for the reaction to occur, opening the well after the reaction has occurred, and removing the fluids containing the sulfur which reacted to form sulfur compounds.

2. The process of claim 1 which comprises a squeeze treatment into the formation.

3. The process of claim 1 where said fluids are petroleum fluids.

4. The process of claim 2 where said fluids are petroleum fluids.

5. The process of claim 1 where said compound is an olefin.

6. The process of claim 2 where said compound is an olefin.

7. The process of claim 3 where said compound is an olefin.

8. The process of claim 4 where said compound is an olefin.

9. A process of inhibiting, reducing, preventing, and/or reversing sulfur-plugging in sulfur-containing fluids in oil wells or gas wells, said fluids containing a component which converts to sulfur, said process comprising adding to said fluids an organic compound capable of reaction with sulfur and reacting said compound with said sulfur.

10. The process of claim 9 which comprises a squeeze treatment into the formation.

11. The process of claim 9 where said compound is an olefin.

12. The process of claim 10 where said compound is an olefin.

* * * * *